(12) United States Patent
Okuyama et al.

(10) Patent No.: US 9,382,438 B2
(45) Date of Patent: Jul. 5, 2016

(54) INK COMPOSITION FOR INK JET RECORDING, PENETRANT FOR INK JET RECORDING, AND RECORDING APPARATUS

(71) Applicant: Seiko Epson Corporation, Tokyo (JP)

(72) Inventors: Tomoyuki Okuyama, Chino (JP); Masahiro Yatake, Shiojiri (JP); Hiroko Hayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 425 days.

(21) Appl. No.: 13/796,228

(22) Filed: Mar. 12, 2013

(65) Prior Publication Data

US 2013/0235134 A1    Sep. 12, 2013

(30) Foreign Application Priority Data

Mar. 12, 2012   (JP) ................. 2012-054046

(51) Int. Cl.
*C09D 11/38* (2014.01)
*C08K 5/05* (2006.01)
*C09D 11/322* (2014.01)

(52) U.S. Cl.
CPC .............. *C09D 11/38* (2013.01); *C09D 11/322* (2013.01)

(58) Field of Classification Search
CPC .................... C08K 5/05; C08K 5/06
See application file for complete search history.

(56) References Cited

U.S. PATENT DOCUMENTS

| 5,750,796 | A | 5/1998 | Hama et al. |
| 6,830,612 | B1 | 12/2004 | Yatake et al. |
| 8,895,639 | B2 * | 11/2014 | Yano et al. .................... 523/160 |
| 2002/0002930 | A1 | 1/2002 | Yamashita et al. |
| 2002/0158952 | A1 | 10/2002 | Adachi et al. |
| 2007/0263058 | A1 * | 11/2007 | Sao et al. ....................... 347/100 |
| 2010/0077937 | A1 | 4/2010 | Kawai et al. |
| 2012/0156449 | A1 | 6/2012 | Tateishi et al. |

FOREIGN PATENT DOCUMENTS

| EP | 0 845 449 B1 * | 9/2002 | ............ C07C 43/11 |
| JP | 08-268919 A | 10/1996 | |
| JP | 11-010851 A | 1/1999 | |
| JP | 11-124524 A | 5/1999 | |
| JP | 11-228898 A | 8/1999 | |
| JP | 2001-354880 A | 12/2001 | |
| JP | 2002-275400 A | 9/2002 | |
| JP | 2004-530732 A | 10/2004 | |

(Continued)

OTHER PUBLICATIONS

STN Structure Search, Mar. 6, 2015.*

*Primary Examiner* — Vu A Nguyen
(74) *Attorney, Agent, or Firm* — Nutter McClennen & Fish LLP; John J. Penny, Jr.; Alex Nagorniy

(57) ABSTRACT

An ink composition for ink jet recording includes a penetrant for ink jet recording that includes a compound represented by the following formula (1) and 1% by mass or less of alcohol represented by the following formula (2).

$$C_mH_{2m+1}-O-(CH_2-CH_2-O)_n-H \qquad (1)$$

(in the formula (1), m represents an integer of 5 to 10; and n represents an integer of 2 to 15)

$$C_mH_{2m+1}-OH \qquad (2)$$

(in the formula (2), m represents an integer of 5 to 10).

11 Claims, 1 Drawing Sheet

(56) References Cited

FOREIGN PATENT DOCUMENTS

| | | |
|---|---|---|
| JP | 2005-082663 A | 3/2005 |
| JP | 2007-153975 A | 6/2007 |
| JP | 2010-077279 A | 4/2010 |
| WO | 01/44386 A1 | 6/2001 |
| WO | 2011/027842 A1 | 3/2011 |

* cited by examiner

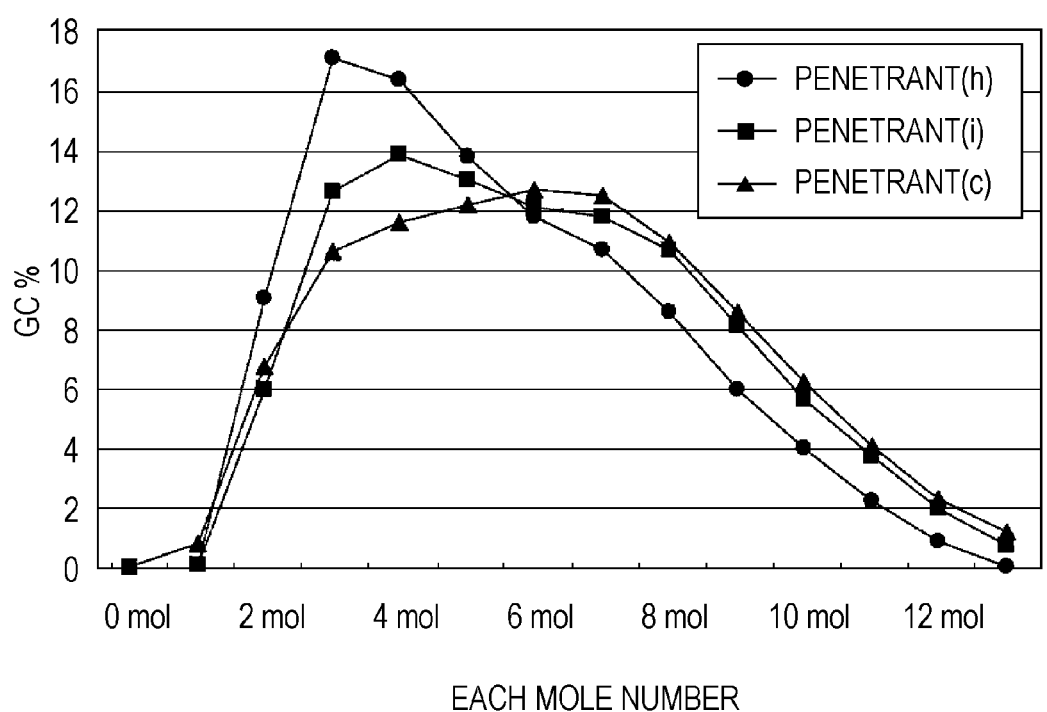

INK COMPOSITION FOR INK JET RECORDING, PENETRANT FOR INK JET RECORDING, AND RECORDING APPARATUS

Priority is claimed under 35 U.S.C. §119 to Japanese Application No. 2012-54046 filed on Mar. 12, 2012, is hereby incorporated by reference in its entirety.

BACKGROUND

1. Technical Field

The present invention relates to an ink composition for ink jet recording, a penetrant for ink jet recording, and a recording apparatus.

2. Related Art

Recently, an ink jet recording method has been widely used in which small ink droplets are ejected from nozzles of an ink jet recording head onto a recording medium such as plain paper or glossy paper to form an image or a character thereon. It is desired that high-quality printing be performed at a high speed on, in particular, plain paper (for example, PPC paper or printing uncoated paper) which is cheap and readily available. However, when an aqueous ink is used for performing printing on plain paper, curling and cockling after printing are large problems to solve. In addition, when an aqueous ink is used for forming a photographic image on dedicated glossy paper, the graininess, glossiness, and wear resistance of the formed image have a tendency to deteriorate.

In order to solve such problems, a technique of adding a water-soluble organic solvent such as 1,2-alkanediol or a glycol ether to an aqueous ink is disclosed (refer to JP-A-2007-153975). According to such a technique, when printing is performed on plain paper, curling characteristics are superior and plural satellite dots are ejected along with main dots. Therefore, when printing is performed on dedicated glossy paper, an image having satisfactory graininess, glossiness, and wear resistance can be formed thereon.

In addition, a technique of adding a nonionic surfactant represented by a formula of $R-[(PO)_m-(EO)_n-H]_x$ (wherein R represents a X-valent hydrocarbon group having 4 to 30 carbon atoms; PO represents a propylene oxy group; EO represents an ethylene oxy group; m represents an integer of 0 to 10; n represents an integer of 10 to 30; and x represents an integer of 1 to 3) to an aqueous ink, is disclosed (refer to JP-A-2005-82663). According to such a technique, an image having superior glossiness can be formed on various recording mediums.

Incidentally, in recent years, various countermeasures have been studied in order to suppress the emission of volatile organic compounds (VOC) which have a concern of adversely affecting people's health. VOC is a collective term for organic compounds which have volatility and are gaseous in the atmosphere. VOC includes 1,2-hexanediol and triethylene glycol monobutyl ether which are added to an aqueous ink in the related art. Therefore, the development of a material, which can be used instead of these water-soluble organic solvents, has been desired. However, it is significantly difficult to obtain the same level of performance as that of the aqueous inks described above in JP-A-2007-153975 and JP-A-2005-82663 while reducing the total VOC emission of an aqueous ink.

In the mean time, the aqueous ink described in JP-A-2007-153975, to which, for example, 1,2-alkanediol or a glycol ether is added, may have attacking properties of changing or deforming members included in an ink jet head. Therefore, the reliability of an ink jet head is impaired after a long period of use and thus there are cases where a satisfactory image cannot be obtained.

In addition, the nonionic surfactant (penetrant), which is described as an example in JP-A-2005-82663, is a material having a propylene oxy group. When such a material is added to an aqueous ink, the clouding point of the entire aqueous ink is reduced and thus there are cases in which the aqueous ink becomes cloudy according to the usage environment, which causes a problem in terms of storage stability. The present inventors found that, in order to solve such a problem, it is effective that an anionic surfactant is further added to the aqueous ink to increase the clouding point of the entire aqueous ink. However, when an anionic surfactant is added, the bubble-foaming properties of the aqueous ink are increased and generated bubbles are difficult to remove. Therefore, it is difficult to use this aqueous ink in practice.

SUMMARY

An advantage of an aspect of the invention is to provide a penetrant for ink jet recording in which storage stability and bubble-removing properties are superior while reducing total VOC emission and thus a satisfactory image can be formed on plain paper or dedicated glossy paper; and to provide an ink composition for ink jet recording containing the penetrant for ink jet recording.

An advantage of another aspect of the invention is to provide an ink composition for ink jet recording in which the reliability of an ink jet recording head is not impaired after a long period of use; and to provide a recording apparatus including the ink composition for ink jet recording.

The invention can be realized in the following forms or application examples.

APPLICATION EXAMPLE 1

According to Application Example 1 of the invention, there is provided an ink composition for ink jet recording including a penetrant for ink jet recording that includes a compound represented by the following formula (1) and 1% by mass or less of alcohol represented by the following formula (2).

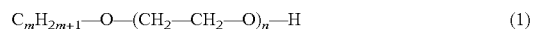

$$C_mH_{2m+1}-O-(CH_2-CH_2-O)_n-H \qquad (1)$$

(in the formula (1), m represents an integer of 5 to 10; and n represents an integer of 2 to 15)

$$C_mH_{2m+1}-OH \qquad (2)$$

(in the formula (2), m represents an integer of 5 to 10)

According to the ink composition for ink jet recording of Application Example 1, the penetrant for ink jet recording is added to the ink composition. As a result, the permeability of an ink to plain paper and the glossiness of an image formed on dedicated glossy paper can be improved without adding 1,2-hexanediol or triethylene glycol monobutyl ether which are added to an aqueous ink in the related art. The compound represented by the formula (1) does not belong to volatile organic compounds (VOC). Therefore, when the penetrant for ink jet recording is added to the ink composition, total VOC emission can be significantly reduced. In addition, the compound represented by the formula (1) has a relatively high clouding point. Therefore, even when the penetrant for ink jet recording is added to the ink composition for ink jet recording, the clouding point of the ink composition is not reduced and thus the ink composition is inhibited from becoming cloudy. Furthermore, the above-described penetrant for ink jet recording does not have attacking properties of changing or deforming members included in an ink jet head. Therefore, the reliability of the ink jet head is not impaired after a long period of use.

APPLICATION EXAMPLE 2

In the ink composition for ink jet recording according to Application Example 1, the compound represented by the formula (1) may have a ratio of m to n (m/n) of 0.5 to 3.0.

APPLICATION EXAMPLE 3

The ink composition for ink jet recording according to Application Example 1 or 2, the penetrant for ink jet recording may further include a compound represented by the following formula (3).

$$C_mH_{2m+1}—O—(CH_2—CH_2—O)_2—H \qquad (3)$$

(in the formula (3), m represents an integer of 5 to 10)

APPLICATION EXAMPLE 4

In the ink composition for ink jet recording according to any one of Application Examples 1 to 3, a clouding point of a composition obtained by excluding a pigment from the ink composition may be higher than or equal to 50° C.

APPLICATION EXAMPLE 5

The ink composition for ink jet recording according to any one of Application Examples 1 to 4 may not substantially contain an anionic surfactant.

APPLICATION EXAMPLE 6

In the ink composition for ink jet recording according to any one of Application Examples 1 to 5, a content of a volatile organic solvent having a normal boiling point of 240° C. or lower may be greater than or equal to 0.1% by mass.

APPLICATION EXAMPLE 7

The ink composition for ink jet recording according to any one of Application Examples 1 to 6 may be used for an ink jet recording apparatus, the ink jet recording apparatus including an ink jet head in which at least one kind selected from an epoxy-based adhesive, a modified polyphenylene ether, and an elastomer is used as a material.

APPLICATION EXAMPLE 8

In the ink composition for ink jet recording according to any one of Application Examples 1 to 7, the total amount of VOC emitted per hour may be less than 5 mg/h.

APPLICATION EXAMPLE 9

According to Application Example 9 of the invention, there is provided a recording apparatus including the ink composition for ink jet recording according to any one of Application Examples 1 to 8.

APPLICATION EXAMPLE 10

According to Application Example 10 of the invention, there is provided a penetrant for ink jet recording including: a compound represented by the following formula (1); and 1% by mass or less of alcohol represented by the following formula (2).

$$C_mH_{2m+1}—O—(CH_2—CH_2—O)_n—H \qquad (1)$$

(in the formula (1), m represents an integer of 5 to 10; and n represents an integer of 2 to 15)

$$C_mH_{2m+1}—OH \qquad (2)$$

(in the formula (2), m represents an integer of 5 to 10)

BRIEF DESCRIPTION OF THE DRAWINGS

The invention will be described with reference to the accompanying drawings, wherein like numbers reference like elements.

FIGURE is a graph illustrating a molecular weight distribution of penetrants (c), (h), and (i) for ink jet recording used in examples.

DESCRIPTION OF EXEMPLARY EMBODIMENTS

Hereinafter, a penetrant for ink jet recording (hereinafter, also referred to as a "penetrant"), an ink composition for ink jet recording (hereinafter, also referred to as an "ink composition"), and a recording apparatus according to preferred embodiments of the invention will be sequentially described. Embodiments which will be described below are examples of the invention. In addition, the invention is not limited to the following embodiments and includes various modification examples within a range not departing from the concepts of the invention.

1. PENETRANT FOR INK JET RECORDING

A penetrant for ink jet recording according to an embodiment of the invention contains a compound represented by the following formula (1); and 1% by mass or less of alcohol represented by the following formula (2).

$$C_mH_{2m+1}—O—(CH_2—CH_2—O)_n—H \qquad (1)$$

(in the formula (1), m represents an integer of 5 to 10; and n represents an integer of 2 to 15)

$$C_mH_{2m+1}—OH \qquad (2)$$

(in the formula (2), m represents an integer of 5 to 10)

In the formula (1), m represents an inter of 5 to 10, preferably 6 to 10, more preferably 6 to 9, and still more preferably 8 and 9. When m represents an integer less than the above-described range, an effect of improving the permeability of the ink composition to plain paper is likely to deteriorate. On the other hand, when m represents an integer greater than the above-described range, the viscosity increases, and thus the amount thereof which can be added to the ink composition is limited. When the viscosity of the ink composition is excessively high, it is difficult to eject the ink composition from an ink jet head. As a result, the permeability of the ink composition to plain paper may not be improved.

In the formulae (1) and (2), a hydrocarbon group represented by $C_mH_{2m+1}—$ may be linear or branched, but is preferably branched. When the hydrocarbon group is branched, the boiling point of the compound represented by the formula (1) is increased. Therefore, the compound has a tendency not to become a volatile organic compound (VOC). In addition, an ink composition having satisfactory permeability is easily obtained and thus a high-quality image can be formed.

The compound represented by the formula (1) can be obtained with a preparation method in which a target molar quantity of ethylene oxide is added to the alcohol represented by the formula (2), which is a starting material, in the presence of a basic catalyst to form a block. That is, the penetrant prepared with the above-described preparation method is a mixture which shows a molecular weight distribution indicating that the mixture contains the compound represented by the formula (1). The alcohol represented by the formula (2) is the alcohol which is the starting material for synthesizing the compound represented by the formula (1). Therefore, the hydrocarbon group in the formula (1) is the same as that in the formula (2).

Examples of the basic catalyst include sodium hydroxide, potassium hydroxide, and ammonia.

Furthermore, it is preferable that the alcohol represented by the formula (2) which is the starting material (hereinafter, also referred to as a "starting alcohol") be removed by distillation under reduced pressure from the obtained mixture. When the starting alcohol is completely consumed for a reaction, it is not necessary that the starting alcohol be removed by distillation under reduced pressure. However, generally, since an unreacted starting alcohol remains, it is preferable that the starting alcohol be removed by distillation under reduced pressure. For example, U.S. Pat. No. 6,830,612, which is one of the related arts, does not describe a treatment of removing the starting alcohol at all, which is different from the preferred example of the invention. On the other hand, according to the embodiment of the invention having the above-described configuration, a mixture having a content of the starting alcohol of 1% by mass or less can be obtained. Such a mixture is preferable from the viewpoint of extremely low VOC concentration because the compound represented by the formula (1) does not belong to volatile organic compounds (VOC). From the viewpoint of reducing VOC concentration, the content of the starting alcohol in the mixture is preferably less than or equal to 0.5% by mass, more preferably less than or equal to 0.1% by mass, still more preferably less than or equal to 0.01% by mass, and most preferably 0% by mass (that is, it is most preferable that the starting alcohol does not remain).

In the formula (1), n represents an integer of 2 to 15, preferably 2 to 9, more preferably 2 to 7, and still more preferably 5 to 7. When the penetrant in which n represents an integer within the above-described range is applied to the ink composition, effects of improving printing quality (chromogenic properties, glossiness, and permeability) and storage stability can be obtained. When n represents an integer greater than the above-described range, hydrophilic properties are increased. As a result, when the penetrant is applied to the ink composition, bubbles are likely to be generated and bubble-removing properties deteriorate. Therefore, it may be difficult to use the penetrant for the ink composition.

In addition, n, which is obtained from a molar quality of prepared ethylene oxide, represents an integer of 2 to 15, preferably 2 to 9, more preferably 2 to 7, and still more preferably 4 to 7. When the penetrant in which n represents an integer within the above-described range is applied to the ink composition, effects of improving printing quality (chromogenic properties, glossiness, and permeability) and storage stability can be obtained.

Furthermore, in the case of a mixture containing the compound represented by the formula (1), in a molecular weight distribution of the mixture in which the horizontal axis represents the addition mole number of EO and the vertical axis represents GC %, the addition mole number of EO of a compound corresponding to the maximum GC % is preferably 2 to 15, more preferably 2 to 12, still more preferably 2 to 9, and even still more preferably 2 to 7. The molecular weight distribution can be measured using GC-MS. When the penetrant in which n represents an integer within the above-described range is applied to the ink composition, effects of improving printing quality (chromogenic properties, glossiness, and permeability) and storage stability can be obtained.

Furthermore, in the case of a mixture containing the compound represented by the formula (1), in a molecular weight distribution of the mixture in which the horizontal axis represents the addition mole number of EO and the vertical axis represents GC %, the total amount of a compound having an addition mole number of EO of 2 to 9 is greater than or equal to 40 GC %, more preferably greater than or equal to 50 GC %, and still more preferably 60 GC %. When the penetrant in which n represents an integer within the above-described range is applied to the ink composition, effects of improving printing quality (chromogenic properties, glossiness, and permeability) and storage stability can be obtained.

In addition, in the compound represented by the formula (1), the ratio of m to n (m/n) is preferably in a range of 0.5 to 3.0 and more preferably 1.2 to 2.0. When the ratio of m to n (m/n) is in the above-described range, the hydrophilic properties and lipophilic properties of the compound represented by the formula (1) are well-balanced. When the compound is applied to the ink composition, effects of improving printing quality (chromogenic properties, glossiness, and permeability) and storage stability are easily obtained.

It is preferable that the penetrant for ink jet recording according to the embodiment further contain a compound represented by the following formula (3).

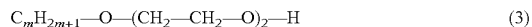

$$C_mH_{2m+1}-O-(CH_2-CH_2-O)_2-H \quad (3)$$

(in the formula (3), m represents an integer of 5 to 10)

The compound represented by the formula (3) is a compound obtained by adding 2 moles of ethylene oxide to the starting alcohol and may be contained in the mixture synthesized in the above-described synthesis method. In addition, the compound represented by the formula (3), which is separately synthesized and is isolated, may be further separately added to the mixture synthesized in the above-described synthesis method.

The content of the compound represented by the formula (3) is preferably 5% by mass to 50% by mass, more preferably 5% by mass to 35% by mass, still more preferably 10% by mass to 25% by mass, and most preferably 12% by mass to 25% by mass, with respect to 100% by mass of the penetrant for ink jet recording according to the embodiment. When the content of the compound represented by the formula (3) is in the above-described range and the compound is applied to the ink composition, both printing quality (chromogenic properties, glossiness, and permeability) and storage stability can be easily improved at the same time.

2. INK COMPOSITION FOR INK JET RECORDING

Hereinafter, the respective components of an ink composition for ink jet recording according to an embodiment of the invention will be described in detail.

2.1. Ink Composition for Ink Jet Recording

The ink composition according to the embodiment contains a penetrant for ink jet recording that includes the compound represented by the formula (1) and 1% by mass or less of the alcohol represented by the formula (2). As the penetrant for ink jet recording, one kind may be used alone or a mixture of two or more kinds may be used.

The ink composition contains the penetrant for ink jet recording. As a result, the ink composition has superior permeability in the case of printing on plain paper; and an image having satisfactory graininess, glossiness, and wear resistance is obtained in the case of printing on dedicated glossy paper, without adding 1,2-hexanediol or triethylene glycol monobutyl ether which can be added to an aqueous ink in the related art. As a result, components belonging to volatile organic compounds (VOC) can be excluded from the ink composition for ink jet recording. Therefore, the total VOC emission of the ink composition for ink jet recording can be significantly reduced. In particular, when two or more kinds of compounds represented by the formula (1) in which m represents an integer of 6 to 9 are used in combination, an effect of improving the glossiness in the case of printing on dedicated glossy paper is easily obtained.

From the viewpoint of reducing VOC concentration, the content of the starting alcohol in the ink composition for ink jet recording is preferably less than or equal to 0.1% by mass, more preferably less than or equal to 0.01% by mass, and still more preferably 0% by mass (that is, it is still more preferable that the starting alcohol does not remain).

In addition, the ink composition for ink jet recording does not corrode members (for example, an epoxy-based adhesive, a modified polyphenyl ether, and an elastomer), included in an ink jet head, to be changed or deformed. Therefore, the ink composition for ink jet recording according to the embodiment has advantageous effects in that the reliability of an ink jet head is not impaired even when the ink composition for ink jet recording is used over a long period.

The content of the penetrant for ink jet recording is preferably 0.5% by mass to 5% by mass and more preferably 0.7% by mass to 2% by mass. When the content of the penetrant for ink jet recording is greater than or equal to 0.5% by mass, the permeability in the case of printing on plain paper and the image quality in the case of printing on dedicated glossy paper are improved. When the content is less than or equal to 5% by mass, the viscosity is appropriately adjusted.

2.2. Coloring Material

A coloring material may be further added to the ink composition for ink jet recording according to the embodiment. The coloring material may be either a dye or a pigment.

Examples of the dye include various kinds of dyes, which can be used for ink jet recording, such as direct dyes, acid dyes, food dyes, basic dyes, reactive dyes, disperse dyes, vat dyes, solubilized vat dyes, and reactive disperse dyes.

The pigment is not particularly limited, and inorganic pigments and organic pigments can be used. Examples of inorganic pigments for black ink include titanium oxides and iron oxides; and carbon blacks (C.I. Pigment Black 7) such as furnace black, lamp black, acetylene black, and channel black. Examples of organic pigments for black ink include black organic pigments such as aniline black (C.I. Pigment Black 1).

Examples of pigments for yellow ink include C.I. Pigment Yellow 1 (Hansa yellow), 3 (Hansa yellow 10G), 12, 13, 14, 17, 24 (flavanthrone yellow), 34, 35, 37, 53, 55, 65, 73, 74, 81, 83, 93, 94, 95, 97, 98, 99, 108 (anthrapyrimidine yellow), 109, 110, 113, 117 (copper complex salt pigment), 120, 128, 133 (quinophthalone), 138, 139 (isoindolinone), 147, 151, 153 (nickel complex pigment), 154, 155, 167, 172, 180, 185, and 213; and a pigment shown in Chem. 1 in the pamphlet of International Publication WO 2011/027842.

Examples of pigments for magenta ink include C.I. Pigment Red 1 (para Red), 2, 3 (toluidine Red), 5 (ITR red), 7, 9, 10, 11, 12, 17, 30, 31, 38 (pyrazolone Red), 42, 88 (thioindigo), 112 (naphthol AS-based pigment), 114 (naphthol AS-based pigment), 122 (dimethyl quinacridone), 123, 144, 149, 150, 166, 168 (anthanthrone orange), 170 (naphthol AS-based pigment), 171, 175, 176, 177, 178, 179 (perylene maroon), 185, 187, 209 (dichloroquinacridone), 219, 224 (perylene-based pigment), and 245 (naphthol AS-based pigment); and C.I. Pigment Violet Red 19 (quinacridone), 23 (dioxazine violet), 32, 33, 36, 38, 43 and 50.

Examples of pigments for cyan ink include C.I. Pigment Blue 15, 15:1, 15:2, 15:3, 15:4, 16 (metal-free phthalocyanine), 18 (alkali blue toner), 25, 60 (threne blue), 65 (violanthrone), and 66 (indigo).

Examples of organic pigments used for color inks other than magenta, cyan, or yellow ink include C.I. Pigment Green 7 (phthalocyanine green), 10 (green gold), 36, and 37; C.I. Pigment Brown 3, 5, 25 and 26; and C.I. Pigment Orange 1, 2, 5, 7, 13, 14, 15, 16, 34, 36, and 38.

In addition, the average particle size of the pigment is not particularly limited, but is preferably in a range of 30 nm to 120 nm, more preferably 30 nm to 100 nm, and still more preferably 30 nm to 80 nm. When the average particle size is greater than or equal to 30 nm, the chromogenic properties (OD) on plain paper is superior. When the average particle size is less than or equal to 120 nm, the glossiness on glossy paper is superior.

The pigment may be dispersed in an aqueous medium using a dispersant. Examples of the dispersant include those having a molecular structure of styrene-(meth)acrylic acid copolymer resin, a weight average molecular weight (hereinafter, simply referred to as a "molecular weight") of 1,600 to 25,000, and an acid value of 100 to 250. When being synthesized, the styrene-acrylic acid copolymer is copolymerized with another copolymerizable monomer (for example, (meth) acrylic acid ester) to improve a function as the dispersant. Specific examples thereof include products manufactured by Johnson Polymer Corporation such as JONCRYL 68 (molecular weight: 10,000, acid value: 195), JONCRYL 680 (molecular weight: 3,900, acid value: 215), JONCRYL 682 (molecular weight: 1,600, acid value: 235), JONCRYL 550 (molecular weight: 7,500, acid value: 200), JONCRYL 555 (molecular weight: 5,000, acid value: 200), JONCRYL 586 (molecular weight: 3,100, acid value: 105), JONCRYL 683 (molecular weight: 7,300, acid value: 150), and B-36 (molecular weight: 6,800, acid value: 250).

In addition, as the pigment, surface-treated carbon blacks or organic pigments, in which a functional group is introduced into a surface thereof and which can be dispersed alone in an aqueous solvent, may be used.

In the ink composition for ink jet recording according to the embodiment, as the coloring material, one kind may be used alone or two or more kinds may be used in combination.

The amount of the coloring material added is not particularly limited, but is preferably 0.5% by mass to 30% by mass and more preferably 1.0% by mass to 12% by mass. When the amount is greater than or equal to 0.5% by mass, the print density is appropriate. When the amount is less than or equal to 30% by mass, the viscosity characteristics of the ink are more appropriate and the ejecting stability is improved.

2.3. Water and Other Components

In the ink composition for ink jet recording, water is a major solvent. Examples of water include pure water, such as ion exchange water, ultrafiltration water, reverse osmosis water, and distilled water; and ultrapure water. In addition, it is preferable that water be sterilized by ultraviolet ray irradiation or hydrogen peroxide because mold or bacteria can be prevented when the ink composition is stored for a long period of time.

A water-soluble glycol may be further added to the ink composition for ink jet recording. A water-soluble glycol has an effect of suppressing the drying of the ink on a nozzle front surface. From the viewpoint of excluding volatile organic compound (VOC) from the ink composition, it is preferable that such a water-soluble glycol have a normal boiling point exceeding 240° C. The normal boiling point described herein represents a boiling point measured at 1 atm.

Specific examples of such a water-soluble glycol include diethylene glycol, triethylene glycol, tripropylene glycol, tetraethylene glycol, polyethylene glycol having a molecular weight of 600 or higher, trimethylolpropane, 1,5-pentanediol, 1,6-hexanediol, glycerine, meso-erythritol, and pentaerythritol. As the water-soluble glycol, one kind may be used alone or two or more kinds may be used in combination. The amount of the water-soluble glycol added is preferably 1% by mass to 30% by mass and more preferably 3% by mass to 15% by mass.

A saccharide may be further added to the ink composition for ink jet recording. By adding a saccharide thereto, a clogging phenomenon in which the ink is dried at a tip of a head and clogging occurs can be avoided.

Examples of the saccharide include monosaccharides and polysaccharides, and specific examples thereof include glucose, mannose, fructose, ribose, xylose, arabinose, lactose, galactose, aldonic acid, glucitol, maltose, cellobiose, sucrose, trehalose, and maltotriose; and alginic acid and salts thereof, cyclodextrins, and celluloses. The amount of the saccharide added is preferably 0.05% by mass to 30% by mass.

A preservative and a fungicide may be further added to the ink composition for ink jet recording according to the embodiment. Examples thereof include sodium benzoate, sodium pentachlorophenol, sodium 2-pyridinethiol-1-oxide, sodium sorbate, sodium dehydroacetates, and 1,2-benzisothiazolin-3-one (PROXEL CRL, PROXEL BDN, PROXEL GXL, PROXEL XL-2, and PROXEL TN; manufactured by ICI).

In addition, optionally, a pH adjuster, a dissolution aid, or an antioxidant may be further added to the ink composition for ink jet recording according to the embodiment. Examples thereof include amines such as diethanolamine, triethanolamine, propanolamine, and morpholine and modified products thereof; inorganic salts such as potassium hydroxide, sodium hydroxide, and lithium hydroxide; ammonium hydroxide; tetraammonium hydroxides (for example, tetramethylammonium); carbonates such as potassium carbonate, sodium carbonate, and lithium carbonate; phosphates; N-methyl-2-pyrrolidone; ureas such as urea, thiourea, and tetramethylurea; allophanates such as allophanate and methyl allophanate; biurets such as biuret, dimethyl biuret, and tetramethyl biuret; and L-ascorbic acid and salts thereof.

2.4. Physical Properties

2.4.1. Amount of Volatile Organic Compounds (VOC)

In the ink composition for ink jet recording, the content of a volatile organic solvent having a normal boiling point of 240° C. or lower is less than or equal to 0.1% by mass, preferably less than or equal to 0.05% by mass, more preferably 0.01% by mass, and still more preferably 0% by mass.

When the ink composition contains the penetrant for ink jet recording, the ink composition has superior permeability in the case of printing on plain paper; and an image having satisfactory graininess, glossiness, and wear resistance is obtained in the case of printing on dedicated glossy paper, without adding a water-soluble organic solvent such as 1,2-alkanediol which can be added to an aqueous ink in the related art. Therefore, since components belonging to volatile organic compounds (VOC) can be excluded from the ink composition, the total VOC emission of the ink composition can be significantly reduced. As a result, in a recording apparatus including the ink composition for ink jet recording according to the embodiment, the total VOC emission can be significantly reduced. In the ink composition for ink jet recording, the total amount of VOC emitted per hour is preferably less than 5 mg/h and more preferably less than 1 mg/h. In addition, in the recording apparatus including the ink composition, the total amount of VOC emitted per hour is preferably less than 5 mg/h and more preferably less than 1 mg/h.

2.4.2. Clouding Point

In the ink composition for ink jet recording according to the embodiment, the clouding point of a composition obtained by excluding a pigment from the ink composition is preferably higher than or equal to 50° C. and more preferably higher than or equal to 60° C. It is preferable that the clouding point be higher than or equal to 50° C. because the ink composition can be used in a wide range of temperature range; and stability to transport and storage is satisfactory.

When the clouding point of the ink composition is less than 50° C., it is effective that an anionic surfactant be added to the ink composition in order to increase the clouding point. However, when the anionic surfactant is added to the ink composition, the bubble-foaming properties of the ink composition are increased and the bubble-removing properties deteriorate. Therefore, it may be difficult to use the ink composition. The penetrant for ink jet recording has a relatively high clouding point. Therefore, even when the penetrant is added to the ink composition, the clouding point of the ink composition is not reduced. Therefore, the ink composition is inhibited from becoming cloudy without separately adding the anionic surfactant thereto. Accordingly, it is preferable that the ink composition does not substantially contain an anionic surfactant. "Not substantially containing an anionic surfactant" represents that the ink composition does not contain an anionic surfactant in an amount for exhibiting an effect of the addition or more. For example, the amount of the anionic surfactant added to the ink composition is less than or equal to 0.1% by mass and preferably less than or equal to 0.05% by mass.

Examples of the anionic surfactant include alkyl ether sulfonic acid ester salts, alkyl sulfonic acid salts, alkyl phosphoric acid salts, alkyl phosphoric acid ester salts, and polyoxyethylene alkyl ether phosphoric acid salts. Examples of a counter-cation include lithium ion, sodium ion, potassium ion, mono- to tri-alkyl ammonium, and mono- to tri-ethanol ammonium.

The clouding point of the ink composition can be measured as follows. First, 30 g of composition, obtained by excluding a pigment (sold content) from the ink composition, and a stirring bar are added to a 100 mL sample bottle and are stirred while heating it with a hot stirrer. A temperature is measured when this composition becomes cloudy. This temperature is set as the clouding point.

2.4.3. Viscosity

The viscosity at 20° C. of the ink composition for ink jet recording according to the embodiment is preferably 2 mPa·s to 15 mPa·s and more preferably 2 mPa·s to 10 mPa·s. When the viscosity is in this range, ink ejecting properties can be secured. While the shear rate is increased from 10 to 1,000, the viscosity at a shear rate of 200 is measured using a viscoelasticity testing machine MCR-300 (manufactured by Physica) in an environment of 20° C.

2.5. Application

The ink composition for ink jet recording according to the embodiment is used for an ink jet recording method in which droplets of the ink composition are ejected and the droplets are attached onto a recording medium to perform recording. The recording medium may be heated or may not be heated. The recording medium may be heated to improve the quick-drying properties of the attached droplets of the ink composition. Examples of a method of ejecting the droplets of the ink composition include a method (piezoelectric method) in which electric signals are converted into mechanical signals using, for example, an electrostrictive element and an ink, stored in an ink jet head, is intermittently ejected onto a surface of a recording medium to form a character or a symbol thereon; and a method (bubble method) in which a portion, which is extremely close to a portion of ejecting an ink stored in an ink jet head, is rapidly heated to generate bubbles and the ink is intermittently ejected by volume expansion due to the bubbles. Among these, the piezoelectric method is particularly preferably used for the ink composition for ink jet recording according to the embodiment.

An ink jet head used in the piezoelectric method is obtained by bonding an actuator unit and an ejection port unit to each other with an epoxy-based adhesive and bonding the resultant to a case head obtained by injection-molding a resin. The actuator unit includes a communicating plate in which communicating ports are formed, a plate in which pressure chambers are formed, a plate which is a vibrating plate, and an actuator. The plates, in which the communicating ports or the pressure chambers are formed, are formed of a modified polyphenylene ether. In addition, the ejection port unit is formed of an elastomer.

An aqueous ink composition of the related art to which 1,2-alkanediol or the like is added may have attacking properties of changing or deforming members (for example, a modified polyphenylene ether, an elastomer, and an epoxy-based adhesive) included in an ink jet head. Therefore, there are cases in which the reliability of an ink jet head is impaired after a long period of use and thus a satisfactory image cannot be formed. However, in the ink composition for ink jet recording according to the embodiment, the attacking properties to a modified polyphenylene ether, an epoxy-based adhesive, and an elastomer is extremely small. Therefore, the ink composition has an advantageous effect that the reliability of an ink jet head is not impaired after a long period of use.

3. EXAMPLES

The embodiments of the invention will be described in more detail based on Examples and Comparative Examples. However, the embodiments are not limited to these examples.

3.1. Synthesis Examples of Penetrant for Ink Jet Recording

Penetrants (a) to (f) for ink jet recording used in the examples are compounds represented by the following formula (1) which are synthesized from starting alcohols represented by the following formula (2). In the formula (1), m and n represent values shown in Table 1 below. Synthesis examples of these penetrants will be shown below.

$$C_mH_{2m+1}-O-(CH_2CH_2-O)_n-H \quad (1)$$

$$C_mH_{2m+1}-OH \quad (2)$$

TABLE 1

|  | m | n | Content of Starting Alcohol |
|---|---|---|---|
| Penetrant (a) for Ink Jet Recording | 5 | 2 | Less Than or Equal To 1% |
| Penetrant (b) for Ink Jet Recording | 6 | 3 | Less Than or Equal To 1% |
| Penetrant (c) for Ink Jet Recording | 8 | 5 | Less Than or Equal To 1% |
| Penetrant (d) for Ink Jet Recording | 9 | 7 | Less Than or Equal To 1% |
| Penetrant (e) for Ink Jet Recording | 10 | 10 | Less Than or Equal To 1% |
| Penetrant (f) for Ink Jet Recording | 8 | 5 | 1.5% |
| Penetrant (h) for Ink Jet Recording | 8 | 3 | Less Than or Equal To 1% |
| Penetrant (i) for Ink Jet Recording | 8 | 4 | Less Than or Equal To 1% |

3.1.1. Synthesis of Penetrant (c) for Ink Jet Recording

The penetrant (c) was obtained by adding 5 molar equivalents of ethylene oxide to 2-ethylhexanol, which was a starting material, in the presence of a basic catalyst (potassium hydroxide) to form a block. The compound obtained in this way was a mixture which showed a molecular weight distribution indicating that the mixture contained the compound represented by the formula (1) in which n represented 5. Next, 2-ethylhexanol which was the starting alcohol was removed under reduced pressure from the obtained mixture. In this way, the penetrant (c) having a content of 2-ethylhexanol of 1% by mass or lower was obtained.

The molecular weight distribution of the penetrant (c) obtained in this way is shown in FIGURE. In FIGURE, the horizontal axis represents the mole number of ethylene oxide and; and the vertical axis represents the ratio of ethylene oxide to 100% of the total amount of the penetrant for ink jet recording. The molecular weight distribution in FIGURE was measured as follows using a GC-MS device. A sample was heated to 300° C. using a pyrolyzer, volatile components in the sample were collected in liquid nitrogen, and the measurement was performed under the following GC-MS conditions. Next, the residue was heated to 550° C. using a pyrolyzer, the sample was pyrolyzed, and the measurement was performed under the following GC-MS conditions. Based on information regarding both the volatile components and the pyrolyzed material, structures of the penetrants (c), (h), and (i) were identified by fragments in a mass spectrum.

Device Name: GC-MS, manufactured by Agilent Technologies, Inc., GC 6890 MS 5975

Column: manufactured by Frontier Laboratories Ltd., product name "UA-5", length: 30 m, internal diameter: 250 μm, film thickness: 0.25 μm He flow rate: 1 mL/min

3.1.2. Synthesis of Penetrants (a), (b), (d) to (f), (h), and (i) for Ink Jet Recording The penetrants (a), (b), (d) to (f), (h), and (i) were synthesized with the same synthesis method as that of the penetrant (c), except that the molar amounts of the starting alcohol and ethylene oxide prepared were changed as shown in Table 1. For the penetrant (f), the treatment of removing the starting alcohol under reduced pressure was not performed.

3.1.3. Synthesis of Penetrant (g) for Ink Jet Recording

The penetrant (g) was obtained by adding 2 molar equivalents of propylene oxide to 4-methyl-2-pentanol, which was a starting material, in the presence of a basic catalyst (potassium hydroxide) to form a block; and further adding 5 molar equivalents of ethylene oxide thereto to form a block. The compound obtained in this way was a mixture which showed a molecular weight distribution indicating that the mixture contained the compound represented by the formula (4). Next, 4-methyl-2-pentanol which was the starting alcohol was removed under reduced pressure from the obtained mixture. In this way, the penetrant (g) having a content of 4-methyl-2-pentanol of 1% by mass or lower was obtained.

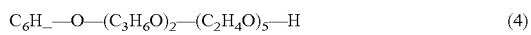

$$C_6H\text{—}O\text{—}(C_3H_6O)_2\text{—}(C_2H_4O)_5\text{—}H \quad (4)$$

3.2. Preparation of Ink Composition

3.2.1. Preparation of Pigment Dispersion

In the ink compositions used in this example, a water-insoluble pigment (cyan pigment; C.I. Pigment Blue 15:4) was used as the coloring material. When a pigment is added to the ink composition, a pigment dispersion in which the pigment is dispersed using a resin dispersant in advance was used.

The pigment dispersion was prepared as follows. First, 40 parts by mass of water-soluble resin (obtained by copolymerization of methacrylic acid/butyl acrylate/styrene/hydroxyethyl acrylate=25/50/15/10 (mass ratio); weight average molecular weight: 12,000) was put into a solution obtained by mixing 7 parts by mass of potassium hydroxide, 23 parts by mass of water, and 30 parts by mass of triethylene glycol mono-n-butyl ether, followed by heating under stirring at 80° C. As a result, an aqueous resin solution was prepared.

3.0 kg of the pigment and 10.25 kg of water were mixed with 1.75 kg of the aqueous resin solution (solid content: 43%), followed by stirring and premixing with a mixture stirrer. As a result, a mixed solution was obtained. The obtained mixed solution was dispersed with a multi-pass method using a horizontal bead mill which is filled with 85% of 0.5 mm zirconia beads and is equipped with a multi-disk impeller having an effective volume of 1.5 liters. Specifically, dispersing was performed in 2 passes under conditions of a bead peripheral speed of 8 m/sec and an ejecting amount of 30 liters per hour. As a result, a pigment-dispersed mixed solution having an average particle size of 325 nm was obtained. Next, the obtained pigment-dispersed mixed solution was circulated and dispersed with a multi-pass method using a horizontal annular bead mill which is filled with 95% of 0.05 mm zirconia beads and has an effective volume of 1.5 liters. 10 kg of the pigment-dispersed mixed solution was dispersed for 4 hours using a 0.015 mm screen under conditions of a bead peripheral speed of 10 m/sec, a circulatory volume of 300 liters per hour. As a result, an aqueous pigment dispersion having a pigment solid content of 20% and 5% of the water-soluble resin was obtained.

3.2.2. Preparation of Ink Composition

Using the obtained pigment dispersion, cyan ink compositions having different material compositions shown in Tables 2 and 3 were prepared. Each ink composition was prepared with a method in which materials shown in Tables 2 and 3 were put into a container, were mixed and stirred with a magnetic stirrer for 2 hours, and were filtered through a membrane filter having a pore diameter of 5 μm to remove impurities such as dust and coarse particles. All the numerical values in Tables 2 and 3 are represented by % by mass, and ion exchange water is added such that the total amount of the ink composition is 100% by mass.

TABLE 2

| Kind of Material | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|---|
| Pigment (C.I. Pigment Blue 15:4) | 3.00 | 3.00 | 3.00 | 3.00 | 3.00 | 3.00 | 3.00 | 3.00 | 3.00 | 3.00 | 3.00 | 3.00 | 3.00 |
| Styrene-Acrylic Resin | 1.20 | 1.20 | 1.20 | 1.20 | 1.20 | 1.20 | 1.20 | 1.20 | 1.20 | 1.20 | 1.20 | 1.20 | 1.20 |
| Penetrant (a) | 2.00 | | | | | | | | | | | | |
| Penetrant (b) | | 2.00 | | | | | | | | | | | |
| Penetrant (c) | | | 2.00 | | | | | | | | | | |
| Penetrant (d) | | | | 2.00 | | | | | | | | | |
| Penetrant (e) | | | | | 2.00 | | | | | | | | |
| Penetrant (f) | | | | | | | | | | | | | 2.00 |
| Penetrant (g) | | | | | | | | | | | 2.00 | 2.00 | |
| Penetrant (h) | | | | | | 2.00 | | | | | | | |
| Penetrant (i) | | | | | | | 2.00 | | | | | | |
| Triethylene Glycol Monobutyl ether | | | | | | | | 5.00 | | | | | |
| Tetraethylene Glycol Butyl Ether | | | | | | | | | 5.00 | | | | |
| 1,2-Hexanediol | | | | | | | | | | 5.00 | | | |
| Anionic Surfactant | | | | | | | | | | | | 0.10 | |
| Glycerin | 10.00 | 10.00 | 10.00 | 10.00 | 10.00 | 10.00 | 10.00 | 10.00 | 10.00 | 10.00 | 10.00 | 10.00 | 10.00 |
| Triethanolamine | 1.00 | 1.00 | 1.00 | 1.00 | 1.00 | 1.00 | 1.00 | 1.00 | 1.00 | 1.00 | 1.00 | 1.00 | 1.00 |
| Water | Balance | Balance | Balance | Balance | Balance | Balance | Balance | Balance | Balance | Balance | Balance | Balance | Balance |
| Total Amount | 100.00 | 100.00 | 100.00 | 100.00 | 100.00 | 100.00 | 100.00 | 100.00 | 100.00 | 100.00 | 100.00 | 100.00 | 100.00 |
| Evaluation Items | | | | | | | | | | | | | |
| Permeability | B | A | A | A | B | A | A | B | C | B | A | A | A |
| Glossiness | B | A | A | A | A | A | A | B | C | B | A | A | A |
| Amount of VOC Emission | A | A | A | A | A | A | A | B | B | C | A | A | C |
| Storage Stability | B | A | A | A | B | A | A | C | C | A | C | A | C |

TABLE 2-continued

| Kind of Material | | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|---|---|---|
| Bubble-Removing Properties | | A | A | A | A | B | A | A | A | A | A | A | C | A |
| Material Attacking Properties | Epoxy Adhesive A | A | A | A | A | B | A | A | — | — | C | — | — | C |
| | Epoxy Adhesive B | A | A | A | A | B | A | A | — | — | B | — | — | C |

TABLE 3

| Kind of Material | Ex. 8 | Ex. 4 | Ex. 9 | Ex. 10 | Ex. 11 | Ex. 12 |
|---|---|---|---|---|---|---|
| Pigment (C.I. Pigment Blue 15:4) | 3.00 | 3.00 | 3.00 | 3.00 | 3.00 | 3.00 |
| Styrene-Acrylic Resin | 1.20 | 1.20 | 1.20 | 1.20 | 1.20 | 1.20 |
| Penetrant (d) | 1.00 | 2.00 | 2.00 | 2.00 | 2.00 | 2.00 |
| 2-Ethylhexyl Glycol | — | — | 0.20 | 0.40 | 0.60 | 0.90 |
| Glycerin | 10.00 | 10.00 | 10.00 | 10.00 | 10.00 | 10.00 |
| Triethanolamine | 1.00 | 1.00 | 1.00 | 1.00 | 1.00 | 1.00 |
| Water | Balance | Balance | Balance | Balance | Balance | Balance |
| Total Amount | 100.00 | 100.00 | 100.00 | 100.00 | 100.00 | 100.00 |
| Total Amount of Ethylene Oxide 2-Mole Adduct | 0.05 | 0.10 | 0.30 | 0.50 | 0.70 | 1.00 |
| Evaluation Items | | | | | | |
| Permeability | B | A | A | A | A | A |
| Glossiness | B | A | A | A | A | A |
| Amount of VOC Emission | A | A | A | A | A | A |
| Storage Stability | A | A | A | A | B | B |
| Bubble-Removing Properties | A | A | A | A | A | A |

In Tables 2 and 3, the following abbreviations are used.
Anionic surfactant: polyoxyethylene alkyl ether phosphoric acid (manufactured by Toho Chemical Industry Co., Ltd., trade name: "PHOSPHANOL RS-610")
2-ethylhexyl glycol (trade name, manufactured by Nippon Nyukazai Co., Ltd., normal boiling point: 272° C.)
In Table 3, "ethylene oxide 2-mole adduct" represents a compound in which n=2 in the formula (1). The total amount of the ethylene 2-mole adduct was obtained from the molecular weight distribution obtained in the above-described GC-MS measurement.

3.3. Evaluation for Ink Composition

3.3.1. Evaluation for Permeability

High-quality plain paper (manufactured by Seiko Epson Corporation, model No. "KA4250NP") was used as a recording medium. An ink jet printer (manufactured by Seiko Epson Corporation, product name: "EM-930C") was filled with any one of the above-described ink compositions. Using this ink jet printer, printing was performed on a surface of the high-quality plain paper at room temperature and normal pressure. In this case, a printing mode is set to "plain paper" and "recommended setting (clear) mode". A printed material was naturally dried, and the bleeding state thereof was evaluated by visual inspection based on the following criteria. The evaluation results thereof are shown in Tables 2 and 3.
A: A satisfactory image in which the bleeding was not observed was obtained
B: The bleeding was slightly observed
C: The beardlike bleeding was observed

3.3.2. Evaluation for Glossiness

Dedicated glossy paper (manufactured by Seiko Epson Corporation, trade name: "PM photo paper") was used as a recording medium. An ink jet printer (manufactured by Seiko Epson Corporation, product name: "EM-930C") was filled with any one of the above-described ink compositions. Using this ink jet printer, printing was performed on a surface of the dedicated glossy paper at a resolution of 720×720 dpi at room temperature and normal pressure. The glossiness of a recording surface at an incident angle of 60° was measured five times for each recording paper using a gloss checker (manufactured by Horiba Ltd., product name: "IG-320"). The average value of glossiness was set to a target for evaluation. The evaluation criteria are as follows. The evaluation results thereof are shown in Tables 2 and 3.
A: The glossiness was greater than or equal to 60
B: The glossiness was greater than or equal to 30 and less than 60
C: The glossiness was less than or equal to 30

3.3.3. Measurement of Emission Amount of Volatile Organic Compounds (VOC)

An ink jet printer (manufactured by Seiko Epson Corporation, product name: "PX-H6000") was filled with any one of the above-described ink compositions. This ink jet printer was put into a metal container made of stainless steel and was sealed. The air in the metal container was circulated for 10 minutes with a pump. During this time, the circulated air was caused to pass through an adsorption tube to collect VOC in the adsorption tube. This adsorption tube was heated to desorb VOC components, and volatile organic compounds (VOC) were quantitatively determined by gas chromatography. The evaluation criterion is the amount of VOC emitted per hour as described below. The evaluation results thereof are shown in Tables 2 and 3.
A: The total VOC emission of the ink composition (recording apparatus) was less than 1 mg/h B: The total VOC emission of the ink composition (recording apparatus) was greater than or equal to 1 mg/h and less than 5 mg/h
C: The total VOC emission of the ink composition (recording apparatus) was greater than or equal to 5 mg/h

3.3.4. Evaluation for Storage Stability

The storage stability was measured by measuring the clouding point of a composition obtained by excluding the pigment (solid content) from each ink composition shown in Tables 2 and 3. The clouding point of the components was measured as follows. First, 30 g of composition, obtained by excluding a pigment (sold content) from the ink composition, and a stirring bar were added to a 100 mL sample bottle and were stirred while heating it with a hot stirrer. This composition was visually inspected and a temperature was measured when this composition became cloudy. This temperature was set as the clouding point. The evaluation criteria are as follows. The evaluation results thereof are shown in Tables 2 and 3.
A: The clouding point was higher than or equal to 60° C.
B: The clouding point was higher than or equal to 50° C. and less than 60° C.
C: The clouding point was less than 50° C.

3.3.5. Evaluation for Bubble-Removing Properties 20 mL of each ink composition shown in Tables 2 and 3 was put into a 100 mL glass bottle. The glass bottle was sealed with a cover and was shaken 10 times to generate bubbles in the ink composition. After shaking, a time taken until the bubbles in the glass bottle were removed was measured.
A: Less than 4 hours
B: Longer than or equal to 4 hours and less than 8 hours
C: Longer than or equal to 8 hours

3.3.6. Evaluation for Material Attacking Properties

One kind of an epoxy adhesive A (manufactured by AbleStik Lab., product name: "ABLEBOND 931-1") and an epoxy adhesive B (manufactured by AbleStik Lab., product name: "ABLEBOND 342-37") were dipped in the ink composition. After dipping, whether the weight of the epoxy adhesive was changed or not and whether impurities were generated or not in the ink composition were inspected.
A: The weight was changed by less than 4%, and no impurities were generated
B: The weight was changed by greater than or equal to 4% and less than 6%, and no impurities were generated
C: The weight was changed by greater than or equal to 6%, or impurities were generated

3.4. Evaluation Results

According to the results of Examples 1 to 7, it was found that, by using the ink composition which contains the penetrant containing the compound represented by the formula (1), the permeability of the ink composition to plain paper; and the glossiness, storage stability, and bubble-removing properties of an image formed on dedicated glossy paper were superior. In addition, the ink composition in which the amount of VOC emission was significantly reduced was obtained.

According to the results of Comparative Examples 1 and 2, it was found that, by using triethylene glycol monobutyl ether or tetraethylene glycol monobutyl ether, the amount of VOC emission was increased; and the printing quality and storage stability deteriorated.

According to the results of Comparative Example 3, it was found that, by using 1,2-hexanediol, the amount of VOC emission was increased; and the printing quality deteriorated. In addition, it was found that the epoxy adhesive was dissolved by 1,2-hexanediol included in the ink composition. Therefore, it is considered that the material attacking properties was high.

According to the result of Comparative Example 4, it was found that, by using the penetrant (g) for ink jet printing, the clouding point of the ink composition was reduced and thus the storage stability deteriorated. According to the result of Comparative Example 5, it was found that, by further adding the anionic surfactant to the ink composition of Comparative Example 4, the clouding point of the ink composition was increased and thus the storage stability was improved; however, the bubble-removing properties deteriorated. As a result, it is difficult to use the ink composition of Comparative Example 5.

According to the result of Comparative Example 6, it was found that, by using the penetrant (f) having a content of the starting alcohol of 1.5%, the amount of VOC emission was significantly increased and the storage stability deteriorated. In addition, it was found that the epoxy adhesive was dissolved by the starting alcohol included in the ink composition. Therefore, it is considered that the material attacking properties was high.

According to Examples 8 to 12 shown in Table 3, it was found that, when total content of ethylene oxide 2-mole adduct is in the specific range, both printing quality (chromogenic properties, glossiness, and permeability) and storage stability can be easily improved at the same time.

The invention is not limited to the above-described embodiments, and various modifications can be made. For example, the invention includes substantially the same configurations (for example, the same functions, methods, and results, or the same objects and effects) as those described in the embodiments. In addition, the invention includes configurations in which components, which are not essential in the above-described configurations of the embodiments, are replaced. In addition, the invention includes configurations capable of achieving the same effects or objects as those of the embodiments. In addition, the invention includes configurations obtained by adding well-known techniques to the configurations of the embodiments.

What is claimed is:

1. An ink composition for ink jet recording comprising a penetrant for ink jet recording that includes a compound represented by the following formula (1) and 1% by mass or less of alcohol based on the ink composition represented by the following formula (2)

$$C_m\text{—}H_{2m+1}\text{—}O\text{—}(CH_2\text{—}CH_2\text{—}O)\text{—}H \qquad (1)$$

(in the formula (1), m represents an integer of 5 to 10; and n represents an integer of 2 to 15)

$$C_mH_{2m+1}\text{—}OH \qquad (2)$$

(in the formula (2), m represents an integer of 5 to 10),
wherein the compound represented by the formula (1) has a ratio of m to n (m/n) of 1.2 to 2.0, and
wherein the penetrant for ink jet recording further includes a compound represented by the following formula (3)

$$C_mH_{2m+1}\text{—}O\text{—}(CH_2\text{—}CH_2\text{—}O)_2\text{—}H \qquad (3)$$

(in the formula (3), m represents an integer of 5 to 10).

2. The ink composition for ink jet recording according to claim 1, wherein a clouding point of a composition obtained by excluding a pigment from the ink composition is higher than or equal to 50° C.

3. The ink composition for ink jet recording according to claim 1 which does not substantially contain an anionic surfactant.

4. The ink composition for ink jet recording according to claim 1, wherein a content of a volatile organic solvent having a normal boiling point of 240° C. or lower is greater than or equal to 0.1% by mass.

5. A method of ink jet recording comprising: ejecting droplets of the ink composition for ink jet recording according to claim 1 with an ink jet recording apparatus onto a recording medium, wherein the ink jet recording apparatus includes an ink jet head in which at least one kind selected from an epoxy-based adhesive, a modified polyphenylene ether, and an elastomer is used as a material.

6. The ink composition for ink jet recording according to claim 1, wherein the total amount of VOC emitted per hour is less than 5 mg/h.

7. A recording apparatus comprising the ink composition for ink jet recording according to claim 1.

8. A recording apparatus comprising the ink composition for ink jet recording according to claim 2.

9. A recording apparatus comprising the ink composition for ink jet recording according to claim 3.

10. A recording apparatus comprising the ink composition for ink jet recording according to claim 4.

11. A recording apparatus comprising the ink composition for ink jet recording according to claim 6.

* * * * *